United States Patent
Michihiro et al.

(10) Patent No.: US 11,598,901 B2
(45) Date of Patent: Mar. 7, 2023

(54) INFORMATION PRESENTING METHOD, INFORMATION PRESENTING DEVICE, AND INFORMATION PRESENTING PROGRAM

(71) Applicant: NIPPON TELEGRAPH AND TELEPHONE CORPORATION, Tokyo (JP)

(72) Inventors: Daiki Michihiro, Musashino (JP); Naoko Kosaka, Musashino (JP); Yukiyoshi Ota, Musashino (JP); Tomohiro Kokogawa, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 36 days.

(21) Appl. No.: 17/057,690

(22) PCT Filed: May 31, 2019

(86) PCT No.: PCT/JP2019/021762
§ 371 (c)(1),
(2) Date: Nov. 23, 2020

(87) PCT Pub. No.: WO2019/230959
PCT Pub. Date: Dec. 5, 2019

(65) Prior Publication Data
US 2021/0263187 A1    Aug. 26, 2021

(30) Foreign Application Priority Data
Jun. 1, 2018   (JP) .............................. JP2018-106520

(51) Int. Cl.
*G01W 1/14*    (2006.01)
*G06F 3/14*    (2006.01)
*G06F 3/04817*   (2022.01)

(52) U.S. Cl.
CPC ................ *G01W 1/14* (2013.01); *G06F 3/14* (2013.01); *G06F 3/04817* (2013.01)

(58) Field of Classification Search
CPC ...................................................... G01W 1/14
(Continued)

(56) References Cited

U.S. PATENT DOCUMENTS 7,089,116 B2 *   8/2006   Smith .................. G08B 27/006
                                                          702/3
7,486,201 B2 *   2/2009   Kelly ................. G01C 21/3694
                                                          455/414.3
(Continued)

FOREIGN PATENT DOCUMENTS

| JP | 2002-367065 A | 12/2002 |
| JP | 2006-301756 A | 11/2006 |
| JP | 2012-141894 A | 7/2012 |

OTHER PUBLICATIONS

Japan Meteorological Agency, "Weather warning/warning", http://www.jma.go.jp/jma/kishou/know/bosai/warning.html, 11 pp.
(Continued)

*Primary Examiner* — Ricky Go
(74) *Attorney, Agent, or Firm* — Xsensus LLP (57) ABSTRACT

A storage unit stores ranking information including an index value relating to past rainfall and a corresponding date-time and damage information including details of damage that occurred due to past rainfall and a corresponding date-time. A real-time data reception unit acquires a spot value and a forecast value of current precipitation. Also, a comparison operation unit computes an index value relating to current rainfall using the acquired spot value and forecast value. The comparison operation unit specifies, with reference to the ranking information, the date-time of an index value relating to past rainfall whose similarity to the computed index value relating to current rainfall is not less than a threshold value.

(Continued)

An information output unit presents, with reference to the damage information, details of damage that occurred in a period whose difference from the specified date-time of the index value relating to past rainfall is in a predetermined range.

6 Claims, 9 Drawing Sheets

(58) Field of Classification Search
USPC .......................................................... 702/3
See application file for complete search history.

(56) References Cited

U.S. PATENT DOCUMENTS

| | | | |
|---|---|---|---|
| 7,751,978 B1* | 7/2010 | Neilley | G01W 1/10 |
| | | | 702/3 |
| 2002/0113826 A1* | 8/2002 | Chuang | G06F 3/0481 |
| | | | 715/835 |
| 2003/0004780 A1* | 1/2003 | Smith | G06Q 30/0252 |
| | | | 705/14.5 |
| 2003/0025627 A1* | 2/2003 | Wilson | G01S 13/951 |
| | | | 702/3 |
| 2008/0278311 A1* | 11/2008 | Grange | G06F 16/29 |
| | | | 340/539.2 |
| 2015/0242586 A1* | 8/2015 | Kagen | G16H 10/20 |
| | | | 705/2 |
| 2016/0275122 A1* | 9/2016 | Kara | G06F 16/248 |
| 2018/0005255 A1* | 1/2018 | Davey-Rogers | G06F 16/25 |
| 2019/0318440 A1* | 10/2019 | Wani | G06Q 50/265 |

OTHER PUBLICATIONS

Japan Meteorological Agency, "Warning risk distribution", http://www.jma.go.jp/jma/kishou/know/bosai/riskmap.html, 4 pp.

Japan Meteorological Agency, "Analysis rainfall", http://www.jma.go.jp/jma/kishou/know/kurashi/kaiseki.html, 3 pp.

* cited by examiner

OBSERVATION POINT: AAA

| ORDER | DATE-TIME | 2-HOUR PRECIPITATION(mm) |
|---|---|---|
| 1 | 1992-07-15 21:00:00 | 75.0 |
| 2 | 2010-07-05 18:00:00 | 67.0 |
| 3 | 2010-06-29 21:00:00 | 61.5 |
|  |  |  |
| n | XXXX-XX-XX XX:XX:XX | XX.X |

⋮

NATIONAL

| ORDER | DATE-TIME | 2-HOUR PRECIPITATION(mm) | OBSERVATION POINT |
|---|---|---|---|
| 1 | 1992-07-15 21:00:00 | 75.0 | AAA |
| 2 | 2010-07-05 18:00:00 | 67.0 | BBB |
| 3 | 2010-06-29 21:00:00 | 61.5 | CCC |
|  |  |  | ZZZ |
| n | XXXX-XX-XX XX:XX:XX | XX.X |  |

Fig. 3

| DATE-TIME | POINT OF ORIGIN | DAMAGE TYPE | RELATED INFORMATION |
|---|---|---|---|
| 1992-07-15 21:00:00 | aaa | LANDSLIDE | DOCUMENT |
| 2010-07-05 18:00:00 | bbb | COLLAPSED BRIDGE | IMAGE |
| 2010-07-05 21:00:00 | ccc | FLOODED ROAD | VIDEO |
| | | | n/a |
| XXXX-XX-XX XX:XX:XX | xxx | | |

INDEX

| OBSERVATION POINT | INDEX | COMPUTATION METHOD OF INDEX VALUE |
|---|---|---|
| AAA | 1-HOUR PRECIPITATION | 1-HOUR FORECAST VALUE |
| AAA | 3-HOUR PRECIPITATION | 2-HOUR SPOT VALUE + 1-HOUR FORECAST VALUE |
| AAA | CONTINUOUS RAINFALL | |
| BBB | 3-HOUR PRECIPITATION | 2-HOUR SPOT VALUE + 1-HOUR FORECAST VALUE |
| | | |

THRESHOLD VALUE

| OBSERVATION POINT | THRESHOLD VALUE |
|---|---|
| AAA | 1-HOUR PRECIPITATION = 30mm |
| BBB | 3-HOUR PRECIPITATION RANKED IN ONE OF THE RANKINGS |
| CCC | CONTINUOUS RAINFALL = 200mm |
| DDD | INDEX VALUE USED RANKED IN ONE OF THE RANKINGS |
| | |

```
                        POINT AAA

OBSERVATION RANKING UPDATE (1974~)

1-HOUR RAINFALL  53mm :    POINT RANKING 23RD
                           ▶ 3RD FOR OCTOBER

3-HOUR RAINFALL  141mm :   NATIONAL RANKING 87TH
                           ▶ 2ND FOR OCTOBER
                           POINT RANKING 1ST
                           ▶ 1ST FOR OCTOBER

CONTINUOUS RAINFALL  191mm :  8TH FOR OCTOBER

PAST SIMILAR RAINFALL:

INFORMATION PRESENTING METHOD, INFORMATION PRESENTING DEVICE, AND INFORMATION PRESENTING PROGRAM

TECHNICAL FIELD

The present invention relates to an information presentation method, an information presentation apparatus, and an information presentation program.

BACKGROUND ART

Conventionally, in the case where a heavy rainfall disaster is expected, the meteorological agency issues values such as analyzed precipitation and short-term precipitation forecasts, emergency warnings, warnings and advisories, record short-time heavy rainfall information, and disaster prevention information (see NPLs 1-3). Disaster prevention information is, for example, information displaying hazard distribution on a map, with hazardous areas categorized by the degree of hazard.

Organizations that conduct crisis management and disaster response in local government bodies, infrastructure firms and the like manually predict how their organization will be affected and examine ways of responding, with reference to such information. For the people belonging to such organizations, it is important to have a correct awareness of the situation under tense conditions, and to predict damage that could subsequently occur, based on the experience and knowledge of damage that has occurred in the past and the like.

CITATION LIST

Non-Patent Literature

[NPL 1] "Weather warnings and advisories", [online], Japan Meteorological Agency, [viewed on Mar. 29, 2018], from www.jma.go.jp

[NPL 2] "Hazard distribution of warnings", [online], Japan Meteorological Agency, [viewed on Mar. 29, 2018], from www.jma.go.jp

[NPL 3] "Analyzed precipitation", [online], Japan Meteorological Agency, [viewed on Mar. 29, 2018], from www.jma.go.jp

SUMMARY OF THE INVENTION

Technical Problem

However, people with little knowledge about the weather have difficulty perceiving the danger from information in the form of numerical values such as analyzed precipitation and short-term precipitation forecasts. Also, since disaster prevention information represented by levels of hazard is abstract information, bias arises in the awareness depending on the recipient of the information, and there is a risk of the information being ignored or missing the mark.

The present invention has been made in view of the above, and an object of the invention is to provide appropriate information for dealing with heavy rainfall disasters.

Means for Solving the Problem

In order to solve the abovementioned problem and achieve the object, an information presentation method according to the present invention is an information presentation method that is executed by an information presentation apparatus that includes a storage unit configured to store rainfall information including a predetermined index value relating to past rainfall and a corresponding date-time and damage information including details of damage that occurred due to past rainfall and a corresponding date-time, the method including acquiring a spot value and a forecast value of current precipitation, computing an index value relating to current rainfall, using the acquired spot value and forecast value, specifying, with reference to the rainfall information, a date-time of the index value relating to past rainfall whose similarity to the computed index value relating to current rainfall is not less than a predetermined threshold value, and presenting, with reference to the damage information, details of damage that occurred in a period whose difference from the specified date-time is in a predetermined range.

Effects of the Invention

According to the present invention, appropriate information for dealing with heavy rainfall disasters can be provided.

DESCRIPTION OF EMBODIMENTS

Hereinafter, an embodiment of the present invention will be described in detail, with reference to the drawings. Note that the present invention is not limited by this embodiment. Also, portions that are the same will be given the same reference signs throughout the drawings.

[Outline of System]

Figure 1:
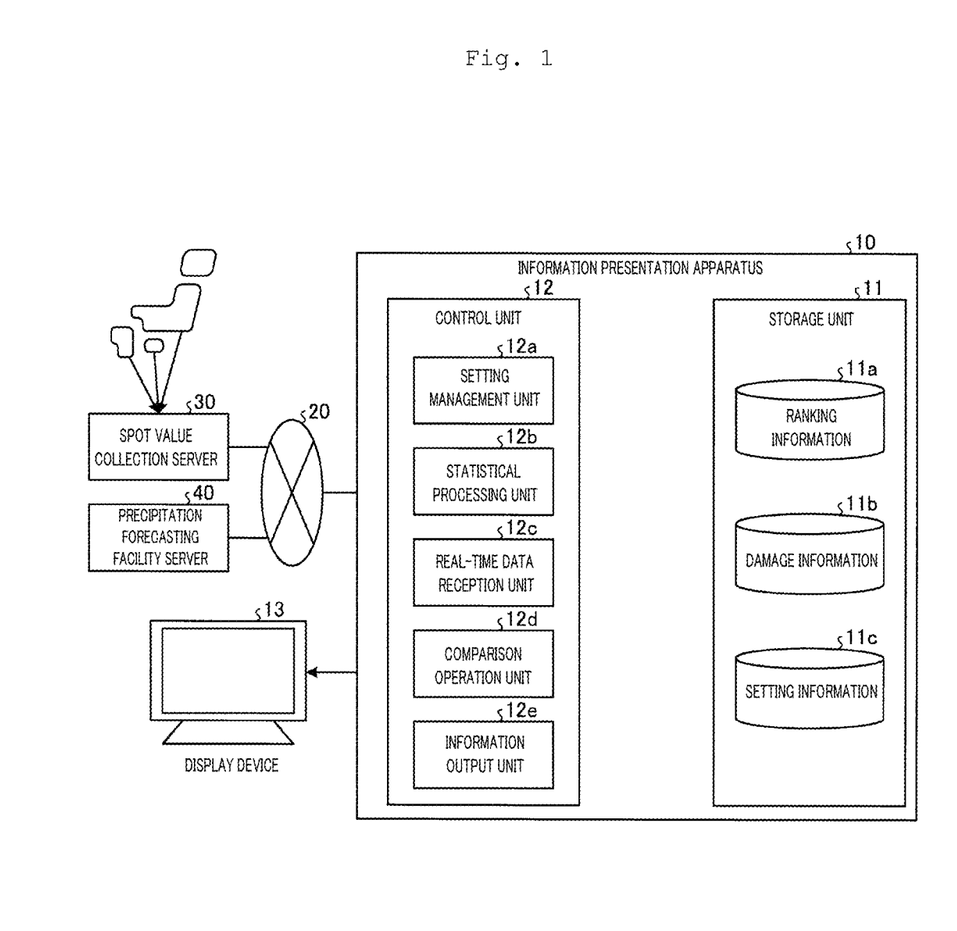
FIG. 1 is a schematic diagram illustrating a schematic configuration of a system that includes an information presentation apparatus according to an embodiment.

FIG. 1 is a schematic diagram illustrating a schematic configuration of a system that includes an information presentation apparatus according to the present embodiment. As illustrated in FIG. 1, an information presentation apparatus 10 is connected to a spot value collection server 30 and a precipitation forecasting facility server 40 via a network 20. Here, the network 20 may be a suitable electrical communication line such as a wired or wireless LAN (Local Area Network) or a VPN (Virtual Private Network).

The spot value collection server 30 is realized by a general-purpose computer such as a server device, and is installed in the meteorological agency, a local public body, a private enterprise or the like that observes precipitation.

The spot value collection server 30 collected spot values of precipitation at observation points throughout the country, and releases or distributes this data. As will be described later, the information presentation apparatus 10 acquires the spot values of precipitation of desired observation points from the spot value collection server 30 periodically, such as every hour, for example, or as required.

The precipitation forecasting facility server 40 is realized by a general-purpose computer such as a server device, and is installed in a precipitation forecasting facility such as the meteorological agency or a private firm that forecasts precipitation. The precipitation forecasting facility server 40 releases or distributes forecast values for precipitation such as analyzed precipitation for the next 6 hours at each observation point. As will be described later, the information presentation apparatus 10 acquires the forecast values for precipitation of desired observation points from the precipitation forecasting facility server 40 periodically, such as every hour, for example, or as required.

The information presentation apparatus 10 is realized by a general-purpose computer such as a server device, and is installed in headquarters for disaster response such as disaster control headquarters, or the like. The information presentation apparatus 10 executes information presentation processing which will be described later, and presents the details of damage that occurred at the time of past rainfall having similar rainfall conditions to the present (hereinafter, also referred to as "similar rainfall"), using spot values and forecast values of current precipitation at desired observation points.

[Configuration of Information Presentation Apparatus]

The information presentation apparatus 10, as illustrated in FIG. 1, is provided with a storage unit 11, a control unit 12, and a display device 13. Also, the information presentation apparatus 10 is provided with an input unit and a communication control unit which are not illustrated.

The input unit is realized using an input device such as a keyboard or a mouse, and inputs various instruction information such as processing start to the control unit 12 in response to input operations by an operator. The communication control unit is realized by a NIC (Network Interface Card) or the like, and controls communication between the control unit 12 and an external device such as the spot value collection server 30 or the precipitation forecasting facility server via the network 20.

The display device 13 is realized by a liquid crystal display, a printing apparatus, a display system such as a GIS (Geographic Information System; see reference document 1), or the like, and the result of the information presentation processing by the information presentation apparatus 10 described later is presented to the user. The display device 13 may be configured to communicate with the control unit 12 via the communication control unit.

[Reference document 1] "What is GIS?", [online], Ministry of Land, Infrastructure, Transport and Tourism, [viewed on Jun. 1, 2018], from www.mlit.gojp The storage unit 11 is realized by a RAM (Random Access Memory), a semiconductor memory device such as a flash memory, or a storage device such as a hard disk or an optical disk. Note that the storage unit 11 may be configured to communicate with the control unit 12 via the communication control unit.

In the present embodiment, ranking information 11a, damage information 11b and setting information 11c are stored in the storage unit 11. Here, the respective information will be described with reference to FIGS. 2 to 4.

Figure 2:
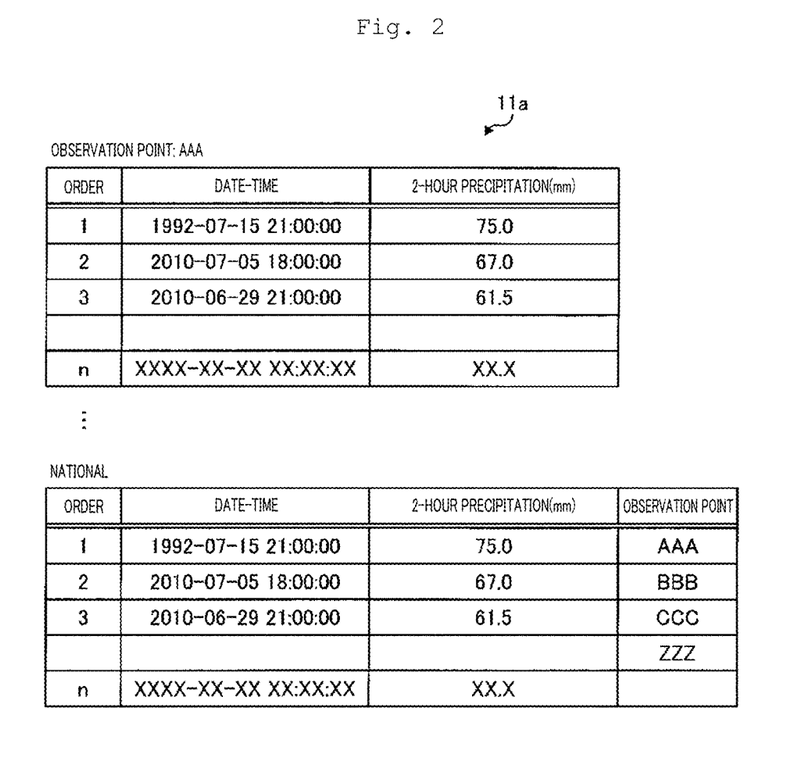
FIG. 2 is a diagram illustrating a data configuration of ranking information.

The ranking information 11a is rainfall information, and includes predetermined index values relating to past rainfall and corresponding date-times. FIG. 2 is a diagram illustrating a data configuration of the ranking information 11a. As shown in FIG. 2, the ranking information 11a includes order, date-time and index value that are aggregated for every observation point.

Here, date-time represents the date and time at which rainfall was observed in the past. Index value is the value of various indices representing the rainfall conditions. 1-hour precipitation, 2-hour precipitation, continuous rainfall and precipitation per unit time are illustrated as indices. In FIG. 2, 2-hour precipitation is illustrated as the index. Order represents the ranking order up to a suitable upper rank n of each index value for past rainfall.

Note that 1-hour precipitation represents precipitation during the hour before the date-time of observation. Also, 2-hour precipitation represents precipitation during the two hours before the date-time of observation. Similarly, x-hour precipitation represents precipitation during the x hours before the date-time of observation. Also, continuous rainfall is a value that integrates precipitation until a suitable fixed period of time during which precipitation is 0 mm appears. That is, continuous rainfall is reset to 0 mm if precipitation that is observed during the suitable fixed period is 0 mm. Also, precipitation per unit time represents the average value of precipitation during a predetermined unit time such as 1 minute, for example.

The ranking information 11a also includes the ranking information of index values for the whole country aggregated for all observation points in every region of the country, in addition to the ranking information of the index values aggregated for every observation point. In FIG. 2, the ranking information of 2-hour precipitation for an observation point "AAA" and the ranking information of 2-hour precipitation for the whole country are illustrated. As shown in FIG. 2, the ranking information of 2-hour precipitation for the whole country includes observation point, in addition to order, date-time and index value.

This ranking information 11a is constituted to include the ranking information of a plurality of index values. For example, the ranking information 11a includes the ranking information of precipitation per unit time, 1-hour precipitation, continuous rainfall and the like, apart from the ranking information of 2-hour precipitation shown in FIG. 2. Also, the ranking information of each index value is constituted to include the ranking information of the index value for each observation point, and the ranking information of the index value for the whole country.

Furthermore, the ranking information of each index value is constituted to include monthly ranking information and ranking information for the full year. That is, the ranking information of each index value includes ranking information consisting of a combination of either monthly or full-year ranking information with ranking information for observation points or the whole country.

Figure 3:
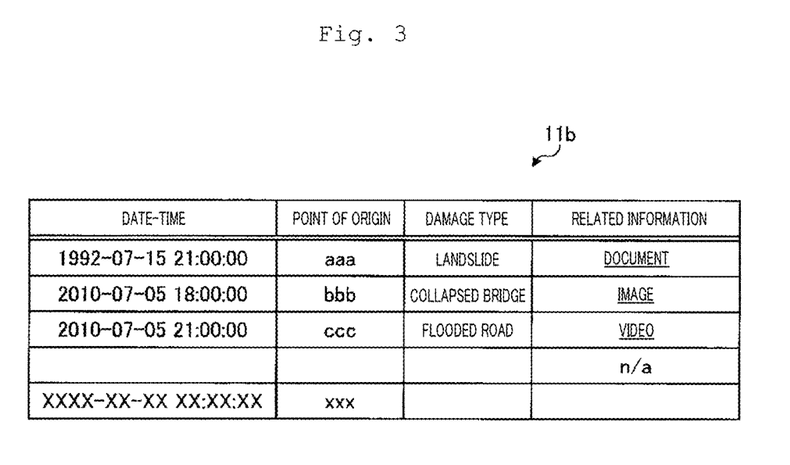
FIG. 3 is a diagram illustrating a data configuration of damage information.

The damage information 11b includes the details of damage that occurred due to past rainfall and corresponding date-times, and is stored in advance in the storage unit 11 via the input unit or the communication control unit.

This damage information 11b is updated in the case where damage has occurred or on a timely basis such as at a set time every day.

FIG. 3 is a diagram illustrating a data configuration of the damage information 11b. As shown in FIG. 3, the damage information 11b includes date-time, point of origin, damage type, and related information. Here, date-time represents the date and time at which damage that occurred due to past rainfall. Point of origin represents the spot where damage occurred.

Note that date-time and point of origin are not limited in terms of format, but can be more effectively utilized in processing described later if represented in a more detailed format. For example, the date-time of occurrence can be represented in detail in order of month and year; day, month and year; hour, day, month and year; and minute, hour, day, month and year. Also, point of origin can be represented in detail in order of prefecture name; city and prefecture names; town/village, city and prefecture names; and district, town/village, city and prefecture names. Point of origin may be represented in further detail using latitudinal and longitudinal information or a geospatial data format including points, links and polygons.

Damage type represents the details of damage such as landslide, collapsed bridge, flooded road, power outage, and transport failure. The details of damage may also include infrastructure failures such as transport failures and power outages and organization-related incidents such as factory stoppages, apart from landslide disasters and flood damage.

Related information refers to documents, images, video and the like that relate to the damage. This related information may, for example, be electronic files in a predetermined format that are linked to respective records of the damage information 11b, and may be held within an organization together with a series of styles in template form. Also, the related information may be respectively associated with individual records.

FIG. 3 shows, for example, that a landslide having occurred at a point of origin "aaa" at 21:00:00 on Jul. 15, 1992 is associated with a document relating to this damage.

Figure 4:
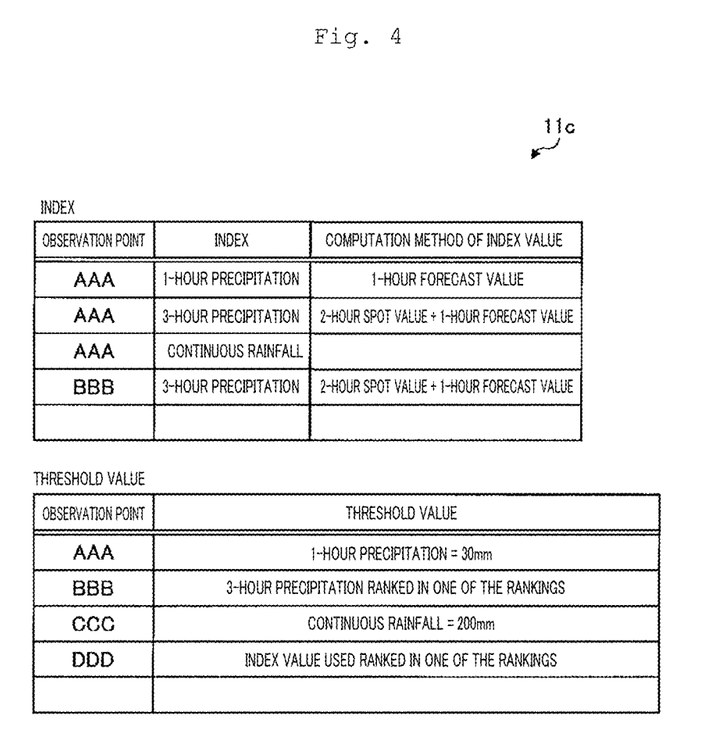
FIG. 4 is a diagram illustrating a data configuration of setting information.

The setting information 11c represents indices and the settings of threshold values that are used in the information presentation processing described later. FIG. 4 is a diagram illustrating a data configuration of the setting information 11c. As shown in FIG. 4, the setting information 11c is constituted to include index value setting information and threshold value setting information.

The index setting information includes observation point, index, and computation method of index value. Here, index is information prescribing an index to be used for each observation point in the information presentation processing described later. The index prescribed here is the same as any of the indices of the ranking information 11a. Computation method of index value is information prescribing a method of computing index values that uses acquired spot values and forecast values of precipitation, in the information presentation processing described later. In the example shown in FIG. 4, for example, computing the values of an index "3-hour precipitation" by adding "2-hour spot value" and "1-hour forecast value" that are acquired is prescribed for the observation point "AAA".

The threshold value setting information includes observation point and threshold value. This threshold value represents a threshold value to be applied when referring to the ranking information 11a in the information presentation processing described later, and is prescribed based on the index value used at each observation point. In the example shown in FIG. 4, for example, setting the case where the value of the index "1-hour precipitation" is 30 mm as the threshold value is prescribed for the observation point "AAA".

Note that, with the threshold value "3-hour precipitation ranked in one of the rankings" for an observation point "BBB", the lowest value in the order, out of the ranking information of 3-hour precipitation, will serve as the threshold value. Also, with the threshold value "index value used ranked in one of the rankings" for an observation point "DDD", the lowest value out of the respective ranking information of the plurality of index values will serve as the threshold value. That is, the threshold value in this case is defined by a logical sum.

The description will now return to FIG. 1. The control unit 12 is realized using an electronic circuit such as a CPU (Central Processing Unit) or an MPU (Micro Processing Unit) or an integrated circuit such as an ASIC (Application Specific Integrated Circuit) or an FPGA (Field Programmable Gate Array). The control unit 12, by executing a processing program stored in a memory, functions as a setting management unit 12a, a statistical processing unit 12b, a real-time data reception unit 12c, a comparison operation unit 12d and an information output unit 12e, as illustrated in FIG. 1. Note that these functional units may be respectively or partially implemented by different hardware.

The setting management unit 12a sets an index and a threshold value to be used in the information presentation processing described later. Specifically, the setting management unit 12a receives an input by an operator via the input unit, for example, creates the setting information 11c shown in FIG. 4, and stores this information in the storage unit 11.

The statistical processing unit 12b generates the ranking information 11a for the index value representing the rainfall conditions. Specifically, the statistical processing unit 12b generates the ranking information 11a shown in FIG. 2, using spot values and the like of past precipitation acquired from the spot value collection server 30 or another server of the meteorological agency, for example, and stores this information in the storage unit 11. The statistical processing units 12b generates the ranking information 11a at a suitable timing such as at midnight every day or at the timing at which the period for which the observed precipitation is 0 mm exceeds a fixed period, and stores this information in the storage unit 11.

The real-time data reception unit 12c functions as an acquisition unit to acquire a spot value and forecast value of current precipitation. Specifically, the real-time data reception unit 12c designates an observation point and acquires a spot value such as a 1-hour spot value of current precipitation for each observation point from the spot value collection server 30, in a periodical cycle, such as every hour, or as required. Also, the real-time data reception units 12c designates an observation point and acquires a forecast value such as a 1-hour forecast value of current precipitation for each observation point from the precipitation forecasting facility server 40, in a periodical cycle, such as every hour, or as required.

The comparison operation unit 12d functions as a computation unit to compute an index value relating to current rainfall, using the acquired spot value and forecast value. Also, the comparison operation unit 12d functions as a specification unit to specify the date-time of an index value relating to past rainfall whose similarity to the computed index value relating to current rainfall is not less than a predetermined threshold value, with reference to the ranking information 11a.

Specifically, the comparison operation unit 12d computes an index value for each observation point prescribed by the setting management unit 12a in advance, with reference to the setting information 11c shown in FIG. 4, using the spot value and forecast value of current precipitation at the designated observation point that are acquired by the real-time data reception unit 12c. For example, the comparison operation unit 12d computes the index value "1-hour precipitation" using the forecast value "1-hour forecast value", and computes the value of the index "3-hour precipitation" using the spot value "2-hour spot value" and the forecast value "1-hour forecast value", for the observation point "AAA".

Next, the comparison operation unit 12d determines whether the index value relating to current rainfall for each computed observation point exceeds the threshold value, with reference to the threshold value of the setting information 11c shown in FIG. 4. For example, in the example shown in FIG. 4, the comparison operation unit 12d determines that the threshold value is exceeded, in the case where the value of the index "1-hour precipitation" computed for the observation point "AAA" exceeds 30 mm.

The comparison operation unit 12d, in the case of having determined that the threshold value is exceeded, specifies the date-time of past similar rainfall whose similarity to the computed index value relating to current rainfall is not less than a predetermined threshold value, with reference to the ranking information 11a.

Here, the comparison operation unit 12d specifies, as similar rainfall, past rainfall corresponding to the approximate order in the ranking information of this index value for the designated observation point, for example. Alternatively, the comparison operation unit 12d may take, as similar rainfall, one of past rainfall whose similarity is not less than a predetermined threshold value, using the similarity to the index value computed at the time of past rainfall for each of a plurality of index values for the designated observation point. Alternatively, the comparison operation unit 12d may take a composite similarity computed by weighting the similarity to the index value at the time of past rainfall for each of a plurality of index values of the designated observation point as being not less than a predetermined threshold value.

Alternatively, the comparison operation unit 12d may take, as similar rainfall, past rainfall whose precipitation per unit time for the designated observation point is not less than a predetermined threshold value. Note that the precipitation per unit time need not necessarily be stored in advance in the storage unit 11 as an index of ranking information as described above. In that case, the comparison operation unit 12d computes the precipitation per unit time from another index such as 3-hour precipitation.

The comparison operation unit 12d updates the ranking information, using the index value relating to current rainfall and the corresponding date-time. That is, the comparison operation unit 12d adds to the ranking information, in the case where the computed index value relating to current rainfall and the date-time are ranked.

Figure 5:
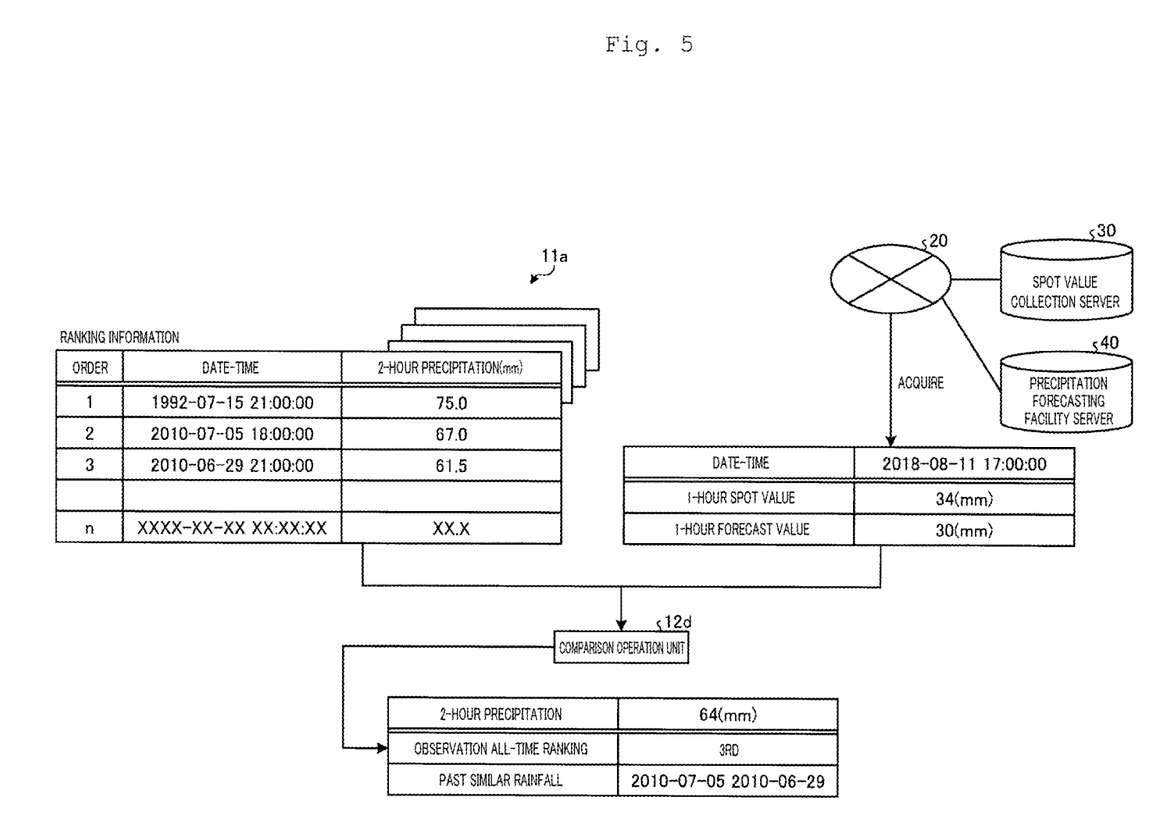
FIG. 5 is a diagram for describing processing of a comparison operation unit.

Here, FIG. 5 is a diagram for describing the processing of the comparison operation unit 12d. As shown in FIG. 5, the real-time data reception unit 12c computes an index value for each observation point, using the spot value and forecast value of current precipitation at the designated observation point that are acquired from the spot value collection server 30 and the precipitation forecasting facility server 40. Also, the comparison operation unit 12d specifies the date-time of similar rainfall of the index value relating to current rainfall, with reference to the ranking information 11a.

In the example shown in FIG. 5, the real-time data reception unit 12c acquires a 1-hour measurement value "34 mm" and a 1-hour forecast value "30 mm" for precipitation at the present date-time "17:00:00 on Aug. 11, 2018" for a certain observation point. Next, the comparison operation unit 12d adds the 1-hour measurement value to the 1-hour forecast value, and computes a 2-hour precipitation "64 mm" as the index value relating to current rainfall.

Also, the comparison operation unit 12d specifies that the current 2-hour precipitation "64 mm" corresponds to 3rd place in the ranking information of 2-hour precipitation for this observation point, with reference to the ranking information 11a. Also, the comparison operation unit 12d specifies that the 2nd place "Jul. 5, 2010" and the 3rd place "Jun. 29, 2010" that correspond approximately to the order of the current 2-hour precipitation as date-times of similar rainfall to the current 2-hour precipitation.

The description will now return to FIG. 1. The information output unit 12e functions as a presentation unit. That is, the information output unit 12e presents the order in the ranking information of the computed index value relating to current rainfall. Note that, in the case of 1st place in the order, a message indicating that there is "a risk that serious damage on a scale not experienced before may occur" is presented. Also, the information output unit 12e presents the date-time of the specified similar rainfall.

Figure 6:
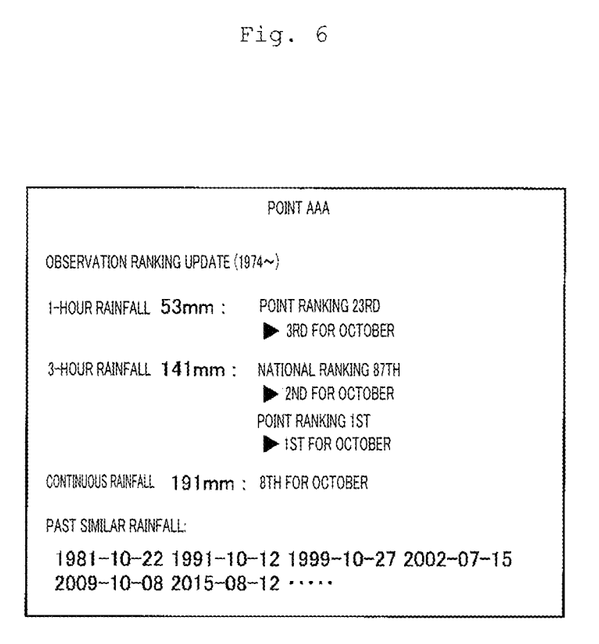
FIG. 6 is a diagram for describing processing of an information output unit.

Here, FIG. 6 is a diagram for describing the processing of the information output unit 12e. As shown in FIG. 6, the information output unit 12e outputs, to the display device 13, the order in the ranking information of each index value relating to current rainfall at the designated observation point, and the date-times of similar rainfall.

In FIG. 6, it is illustrated the current 1-hour rainfall "53 mm" at the observation point "AAA" corresponds to 23rd place in the full-year ranking of 1-hour rainfall for this observation point, while corresponding to 3rd place in the ranking for October, for example. Also, it is illustrated that the 3-hour rainfall "141 mm" of this observation point corresponds to 87th place in the full-year ranking of 3-hour rainfall, while corresponding to 1st place in the ranking for October. Also, it is illustrated that "Oct. 22, 1981", for example, was specified as the date-time of past similar rainfall.

Also, the information output unit 12e presents the details of damage that occurred in a period whose difference from the specified date-time of an index value relating to past rainfall is in a predetermined range, with reference to the damage information 11b. In that case, the information output unit 12e further specifies the damage of a nearby point of origin whose distance from the observation point of the specified past rainfall is in a predetermined range, and presents the details of this specified damage.

Specifically, the information output unit 12e outputs the details thereof to the display device 13, if there is a record, within the damage information 11b, of damage information that occurred nearby whose distance from the observation point of similar rainfall is in a predetermined range, on the same day as the date-time of similar rainfall or within a predetermined period such as within 24 hours.

Note that the date-times of past rainfall of the ranking information 11a may be associated with the records of the damage information 11b in advance. For example, information identifying observation points and date-times of rainfall may be assigned to the records of the damage information 11b. In that case, the information output unit 12e performs output to the display device 13, based on the record of damage information corresponding to similar rainfall.

Figure 7:
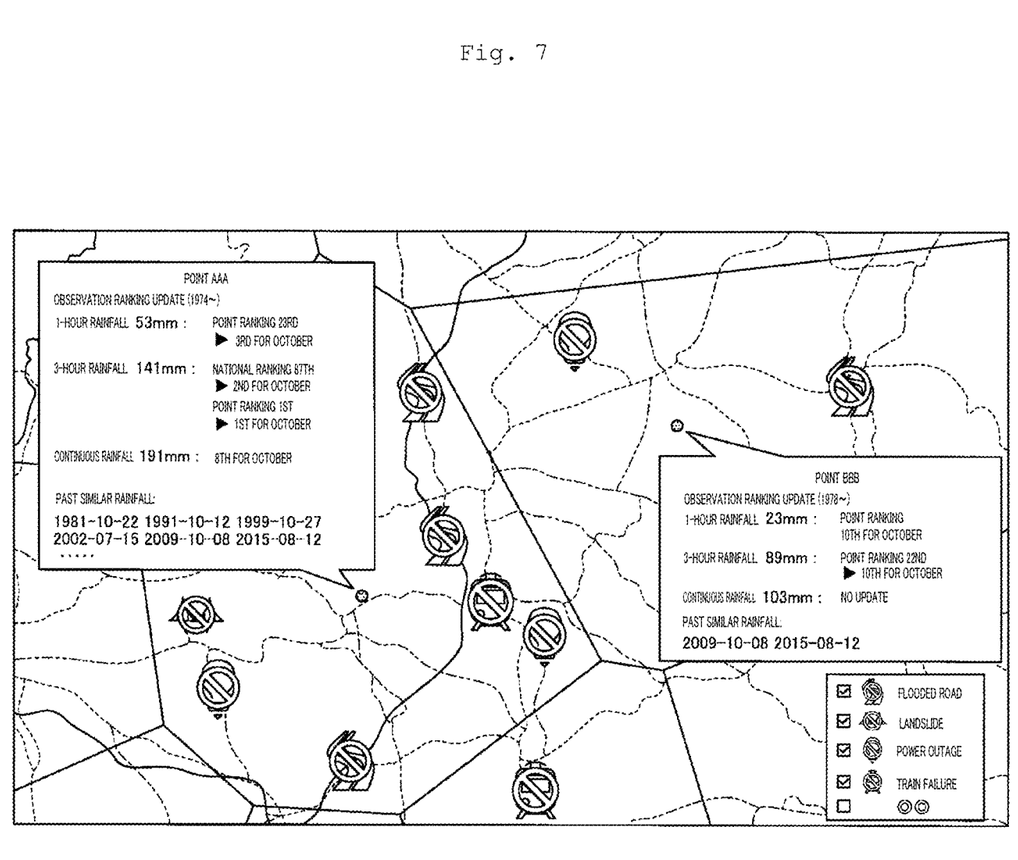
FIG. 7 is a diagram for describing processing of the information output unit.

FIG. 7 is a diagram for describing the processing of the information output unit 12e. As shown in FIG. 7, the information output unit 12e, for example, causes the display device 13 to display the details of damage that occurred in the same region as the information of similar rainfall, on a Voronoi diagram divided into regions by so-called Voronoi tessellation that bisects the region between observation points, with the observation points as representative points. Use of Open Street Map (see reference document 2), for example, is envisaged as the background map in this case.
[Reference document 2]"Open Street Map Japan: free maps for everyone", [online], November 2013, Open Street Map Japan, [viewed on May 22, 2018], Internet <URL: https://openstreetmap.jp /terms_and_privacy>

In FIG. 7, the ranking order of the index value relating to current rainfall for the observation point "AAA" and the date-times of similar rainfall (see FIG. 6), and icons representing damage such as flooding, power outages and train stoppages that occurred near this observation point "AAA" are displayed. Here, if the user of the display device 13 clicks on the icons, information of the damage information 11b can be displayed, and related information can be accessed. In this way, the details of damage that occurred at the time of past rainfall whose rainfall conditions are similar to the present are appropriately displayed.

[Information Presentation Processing]

Figure 8:
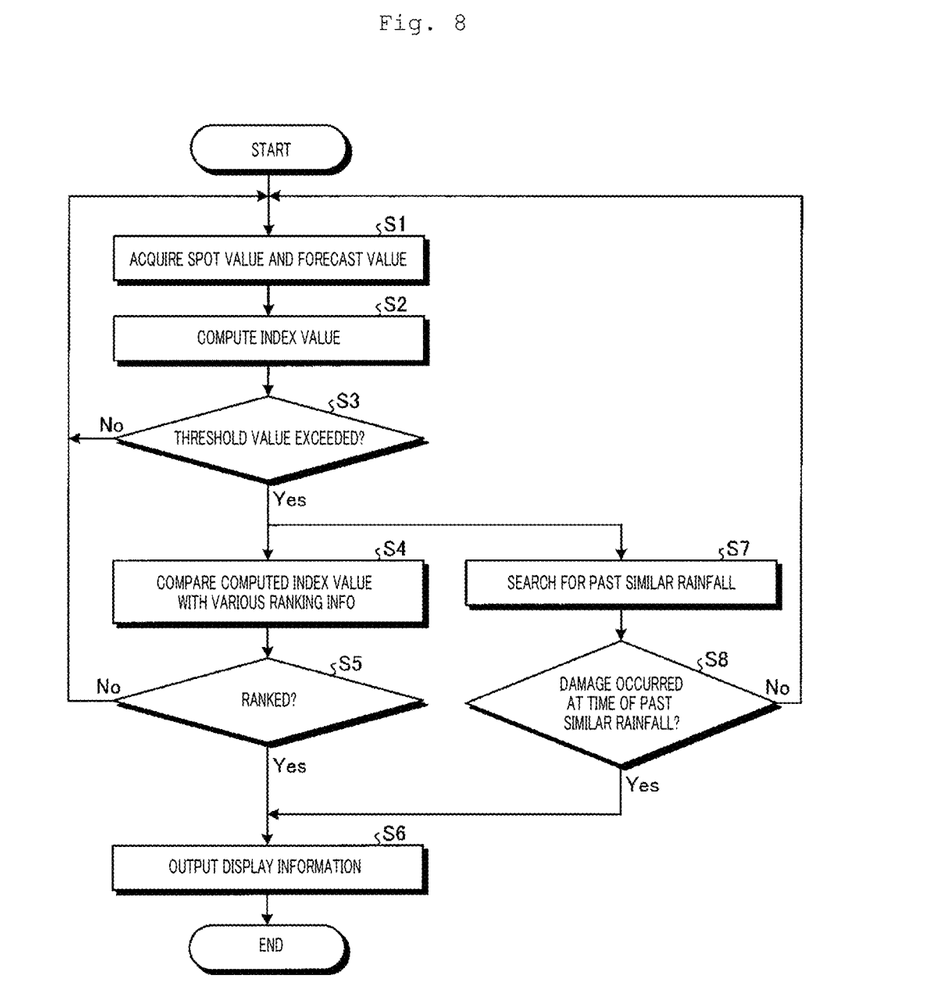
FIG. 8 is a flowchart showing an information presentation processing procedure.

FIG. 8 is a flowchart showing the processing procedure of information presentation processing by the information presentation apparatus 10 according to the present embodiment. The flowchart of FIG. 8 is, for example, started at the timing at which the user inputs an operation instructing to start the processing.

First, the real-time data reception unit 12c designates observation points and acquires a spot value of current precipitation for each observation point from the spot value collection server 30. Also, the real-time data reception unit 12c designates observation points and acquires a forecast value of current precipitation for each observation point from the precipitation forecasting facility server 40 (step S1).

Next, the comparison operation unit 12d computes a predetermined index value for each observation point, using the spot value and forecast value of current precipitation at the designated observation points acquired by the real-time data reception unit 12c (step S2).

The comparison operation unit 12d determines whether the computed index value relating to current rainfall for each observation point exceeds a threshold value, with reference to the threshold value of the setting information 11c (step S3). The comparison operation unit 12d, in the case of having determined that the threshold value is not exceeded (step S3: No), returns the processing to step S1.

On the other hand, the comparison operation unit 12d, in the case of having determined in the processing of step S3 that the threshold value is exceeded, checks whether the computed index value relating to current rainfall is ranked, with reference to the ranking information 11a (steps S4-S5). If the computed index value is not ranked (step S5: No), the comparison operation unit 12d return the processing to step S1. On the other hand, in the computed index value is ranked (step S5: Yes), the comparison operation unit 12d advances the processing to step S6.

Also, the comparison operation unit 12d, in the case of having determined in the processing of step S3 that the threshold value is exceeded, specifies the date-time of past similar rainfall whose similarity to the computed index value relating to current rainfall is not less than a predetermined threshold value, with reference to the ranking information 11a (step S7).

Also, the information output unit 12e checks whether damage occurred in a period whose difference from the specified date-time of the index value relating to past rainfall is in a predetermined range, with reference to the damage information 11b (step S8). If damage did not occur (step S8: No), the information output unit 12e returns the processing to step S1. On the other hand, if damage did occur (step S8: Yes), the information output unit 12e advances the processing to step S6.

In the processing of step S6, the information output unit 12e outputs the order in the ranking information of each index value relating to current rainfall at the designated observation points, the date-time of similar rainfall, and the details of damage that occurred near the observation point of similar rainfall to the display device 13 as display information. The series of information presentation processing is thereby completed.

As described above, in the information presentation apparatus 10 of the present embodiment, the storage unit 11 stores the ranking information 11a including a predetermined index value relating to past rainfall and the corresponding date-time, and the damage information 11b including the details of damage that occurred due to past rainfall and the corresponding date-time. Also, the real-time data reception unit 12c acquires the spot value and forecast value of current precipitation. Also, the comparison operation unit 12d computes the index value relating to current rainfall, using the acquired spot value and forecast value. Also, the comparison operation unit 12d specifies the date-time of the index value relating to past rainfall whose similarity to the computed index value relating to current rainfall is not less than a predetermined threshold value, with reference to the ranking information 11a. Also, the information output unit 12e presents the details of damage that occurred in a period whose difference from the specified date-time of the index value relating to past rainfall is in a predetermined range, with reference to the damage information 11b.

The information presentation apparatus 10 thereby appropriately displays the details of damage such as infrastructure failures and organization-related incidents, apart from landslide disasters and flood damage, that occurred at the time of past rainfall whose rainfall conditions are similar to the present. Accordingly, it is possible for people belonging to organizations that conduct crisis management and disaster response in local government bodies, infrastructure firms or the like to have a correct awareness of the situation without bias under tense conditions and to thoroughly implement suitable measures. In this way, according to the information presentation processing of the information presentation apparatus 10, it becomes possible to present appropriate information for dealing with heavy rainfall disasters.

Also, the storage unit 11 further includes the point of origin of damage in the damage information 11b, and the information output unit 12e further specifies the damage of a nearby point of origin whose distance from the observation point of specified past rainfall is in a predetermined range, and presents the details of the specified damage. It thereby becomes possible to present places where there is a high risk of damage occurring to people without knowledge or experience in a readily comprehendible manner, and present damage information that is most appropriate for dealing with heavy rainfall disasters.

Also, the comparison operation unit 12d further updates the ranking information 11a using the computed index value relating to current rainfall and the corresponding date-time. Also, the information output unit 12e further presents the order in the ranking information of the computed index value relating to current rainfall. It thereby further becomes possible for people who are not knowledgeable about the weather to readily perceive the situation.

[System Configuration and Related Matters]

The constituent elements of the illustrated apparatuses are functionally conceptual elements, and need not necessarily be physically constituted in the manner illustrated. That is, the specific configuration of the distribution or integration of the apparatuses is not limited to the illustrated configuration, and a configuration can be adopted in which all or some of the apparatuses are functionally or physically distributed or integrated in suitable units, according to factors such as the type of load or use conditions. Furthermore, the respective processing functions that are performed in the apparatuses can be realized by a CPU and programs that are analyzed and executed by the CPU with respect to the entirety or a suitable portion thereof, or, alternatively, can be realized as hardware implemented by wired logic.

Also, of the various processing described in the present embodiment, all or part of the processing described as being performed automatically can be entirely or partially performed manually, or, alternatively, can also be entirely or partially performed automatically by a known method. In addition, processing procedures, control procedures, specific names and information including various data and parameters that are shown in the above-mentioned document and drawings can be suitably changed, except where stated otherwise.

[Program]

A program in which the processing that is executed by the information presentation apparatus 10 according to the above embodiment is written in a language executable by a computer can also be created. As one embodiment, the information presentation apparatus 10 can be implemented by installing an information presentation program for executing the above information presentation processing on a desired computer as package software or online software. For example, an information processing apparatus can be caused to function as the information presentation apparatus 10, by causing the information processing apparatus to execute the above information presentation program. An information processing apparatus as referred to here includes a desktop or laptop computer. Also, the category of information processing apparatuses additionally includes mobile communication terminals such as smartphones, mobile phones and PHSs (Personal Handyphone Systems), as well as slate terminals such as PDAs (Personal Digital Assistants).

The information presentation apparatus 10 can also be implemented as a server device that provides services relating to the above information presentation processing, with a terminal device that is used by a user as the client. For example, the information presentation apparatus 10 is implemented as a server device that provides an information presentation processing service for outputting the details of damage that occurred at the time of similar rainfall, with the spot value and forecast value of current precipitation as inputs. In this case, the information presentation apparatus 10 may be implemented as a web server, or may be implemented as a cloud that provides services relating to the above information presentation processing through outsourcing. Hereinafter, an example of a computer that executes an information presentation program for realizing similar functions to the information presentation apparatus 10 will be described.

Figure 9:
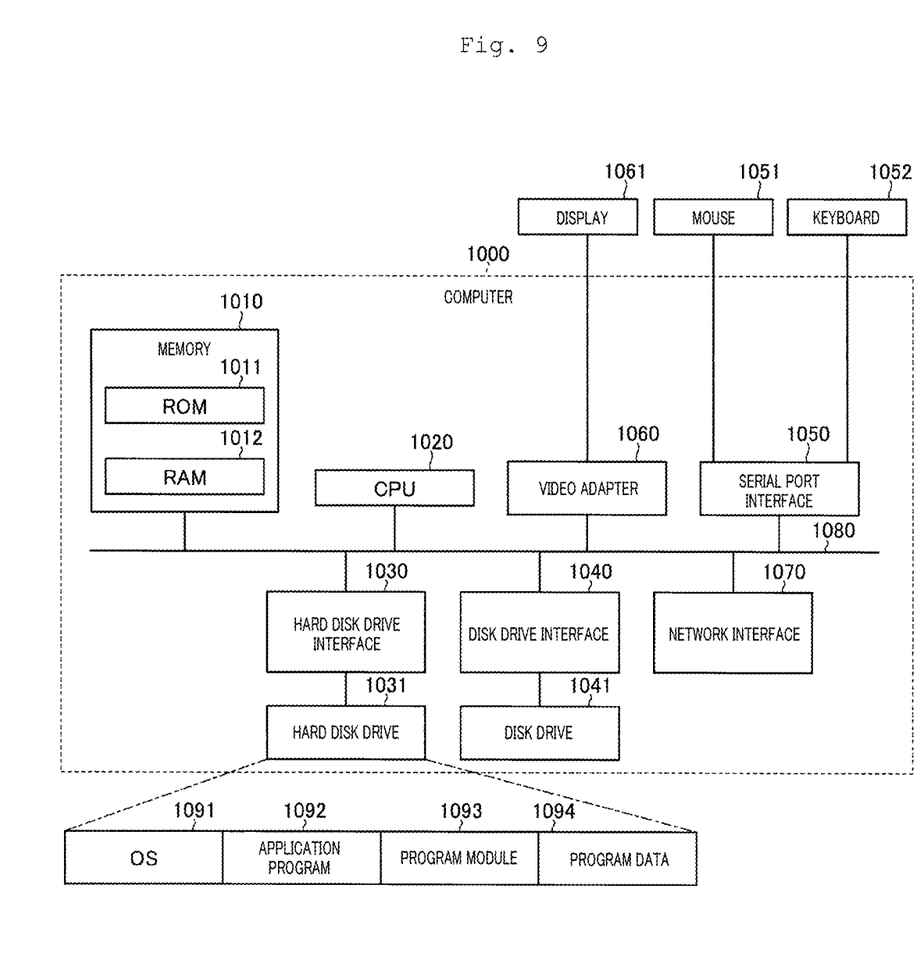
FIG. 9 is a diagram illustrating a computer that executes an information presentation program.

FIG. 9 is a diagram showing an example of a computer that executes the information presentation program. A computer 1000 has, for example, a memory 1010, a CPU 1020, a hard disk drive interface 1030, a disk drive interface 1040, a serial port interface 1050, a video adapter 1060, and a network interface 1070. These components are connected by a bus 1080.

The memory 1010 includes a ROM (Read Only Memory) 1011 and a RAM 1012. The ROM 1011 stores a boot program such as a BIOS (Basic Input Output System), for example. The hard disk drive interface 1030 is connected to a hard disk drive 1031. The disk drive interface 1040 is connected to a disk drive 1041. A removable storage medium such as a magnetic disk or an optical disk, for example, is inserted into the disk drive 1041. A mouse 1051 and a keyboard 1052, for example, are connected to the serial port interface 1050. A display 1061, for example, is connected to the video adapter 1060.

Here, the hard disk drive 1031 stores an OS 1091, an application program 1092, a program module 1093, and program data 1094, for example. The various information described in the above embodiment is stored in the hard disk drive 1031 or the memory 1010, for example.

Also, the information presentation program is stored in the hard disk drive 1031 as the program module 1093 which contains commands that are executed by the computer 1000, for example. Specifically, the program module 1093 defining the various processing that is executed by the information presentation apparatus 10 described in the above embodiment is stored in the hard disk drive 1031.

Also, the data that is used for information processing by the information presentation program is stored in the hard disk drive 1031, for example, as the program data 1094. The CPU 1020 reads out the program module 1093 and the program data 1094 stored in the hard disk drive 1031 to the RAM 1012 as needed, and executes the above-mentioned procedures.

Note that the program module 1093 and the program data 1094 related to the information presentation program are not limited to being stored in the hard disk drive 1031, and may, for example, be stored in a removable storage medium, and read out by the CPU 1020 via the disk drive 1041 or the like. Alternatively, the program module 1093 and the program data 1094 related to the information presentation program may be stored on another computer connected via a network such as a LAN (Local Area Network) or a WAN (Wide Area Network), and read out by the CPU 1020 via the network interface 1070.

Although the above is a description of an embodiment to which an invention made by the inventor is applied, the present invention is not limited by the description or drawings that form part of the disclosure of the present invention according to the present embodiment. That is, other embodiments, working examples, operation technologies and the like that are made by a person skilled in the art or the like based on the present embodiment are all encompassed in the category of the present invention.

REFERENCE SIGNS LIST

10 Information presentation apparatus
11 Storage unit
11a Ranking information
11b Damage information
11c Setting information
12 Control unit
12a Setting management unit
12b Statistical processing unit
12c Real-time data reception unit
12d Comparison operation unit
12e Information output unit 20 Network
30 Spot value collection server
40 Precipitation forecasting facility server

The invention claimed is:

1. An information presentation method for execution by an information presentation apparatus that includes a memory configured to store rainfall information including a predetermined index value relating to past rainfall and a corresponding date-time and damage information including details of damage that occurred due to past rainfall and a corresponding date-time, the method comprising:
  acquiring a spot value and a forecast value of current precipitation;
  computing an index value relating to current rainfall, using the acquired spot value and forecast value;
  specifying, with reference to the rainfall information, a date-time of the index value relating to past rainfall whose similarity to the computed index value relating to current rainfall is not less than a predetermined threshold value, the predetermined threshold value being determined in accordance with ranking information; and
  presenting, with reference to the damage information, details of damage that occurred in a period whose difference from the specified date-time is in a predetermined range, wherein
  the presenting comprises presenting the details of the damage as a plurality of icons, each of the plurality of icons corresponding to one of a plurality of observation points, and, in response to an actuation of one of the plurality of icons by a user, presenting further details of the damage corresponding to a corresponding one of the plurality of observation points, wherein the plurality of icons are presented on a map.

2. The information presentation method according to claim 1, wherein the memory further stores, in the damage information, a point of origin of the damage that occurred at the date-time of the damage, in the presenting, the damage of a nearby point of origin whose distance from an observation point of the specified past rainfall is in a predetermined range is specified, and the details of the specified damage are presented.

3. The information presentation method according to claim 1, wherein, in the specifying, the rainfall information is further updated using the computed index value relating to current rainfall and the corresponding date-time, and in the presenting, an order in the rainfall information of the computed index value relating to current rainfall is further presented.

4. The information presentation method according to claim 1, wherein the map is divided in accordance with a Voronoi tessellation.

5. An information presentation apparatus comprising:
  a memory configured to store rainfall information including a predetermined index value relating to past rainfall and a corresponding date-time and damage information including details of damage that occurred due to past rainfall and a corresponding date-time; and
  circuitry configured to
    acquire a spot value and a forecast value of current precipitation;
    compute an index value relating to current rainfall, using the acquired spot value and forecast value;
    specify, with reference to the rainfall information, a date-time of the index value relating to past rainfall whose similarity to the computed index value relating to current rainfall is not less than a predetermined threshold value, the predetermined threshold value being determined in accordance with ranking information; and
    present, with reference to the damage information, details of damage that occurred in a period whose difference from the specified date-time is in a predetermined range, wherein
  the circuitry is configured to present the details of the damage as a plurality of icons, each of the plurality of icons corresponding to one of a plurality of observation points, and, in response to an actuation of one of the plurality of icons by a user, present further details of the damage corresponding to a corresponding one of the plurality of observation points, wherein the plurality of icons are presented on a map.

6. A non-transitory computer readable medium including an information presentation program for causing a computer to execute:
  acquiring a spot value and a forecast value of current precipitation;
  computing an index value relating to current rainfall, using the acquired spot value and forecast value;
  specifying, with reference to rainfall information including a predetermined index value relating to past rainfall and a corresponding date-time, a date-time of the index value relating to past rainfall whose similarity to the computed index value relating to current rainfall is not less than a predetermined threshold value, the predetermined threshold value being determined in accordance with ranking information; and
  presenting, with reference to damage information including details of damage that occurred due to past rainfall and a corresponding date-time, details of damage that occurred in a period whose difference from the specified date-time is in a predetermined range, wherein
  the presenting comprises presenting the details of the damage as a plurality of icons, each of the plurality of icons corresponding to one of a plurality of observation points, and, in response to an actuation of one of the plurality of icons by a user, presenting further details of the damage corresponding to a corresponding one of the plurality of observation points wherein the plurality of icons are presented on a map.

* * * * *